United States Patent
Reid et al.

(10) Patent No.: US 10,252,178 B2
(45) Date of Patent: Apr. 9, 2019

(54) TOY SYSTEM WITH MANUALLY OPERATED SCANNER

(71) Applicant: Hasbro, Inc., Pawtucket, RI (US)

(72) Inventors: Nicholas Reid, Providence, RI (US); William Gajda, Cranston, RI (US); Benjamin Parry Taylor, Quincy, MA (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

(21) Appl. No.: 14/848,666

(22) Filed: Sep. 9, 2015

(65) Prior Publication Data
US 2016/0067628 A1 Mar. 10, 2016

Related U.S. Application Data (60) Provisional application No. 62/048,789, filed on Sep. 10, 2014, provisional application No. 62/127,255, filed on Mar. 2, 2015.

(51) Int. Cl.
*A63H 33/42* (2006.01)
*A63H 33/26* (2006.01)
(Continued)

(52) U.S. Cl.
CPC .............. *A63H 33/42* (2013.01); *A63F 9/24* (2013.01); *A63F 13/655* (2014.09); *A63F 13/92* (2014.09);
(Continued)

(58) Field of Classification Search
USPC ............. 446/73, 83, 98, 172, 352, 359, 484
See application file for complete search history.

(56) References Cited

U.S. PATENT DOCUMENTS 1,389,372 A * 8/1921 Mitera .................... A63H 13/12
446/236
2,846,222 A * 8/1958 Handler ................... A63H 5/00
446/246
(Continued)

FOREIGN PATENT DOCUMENTS

| EP | 2680594 | 1/2014 |
| JP | 2003070021 | 3/2003 |

(Continued)

OTHER PUBLICATIONS

"What Are Makies?" captured Sep. 9, 2015, http://mymakie.com/about/, 6 pages.
(Continued)

*Primary Examiner* — Nini Legesse
(74) *Attorney, Agent, or Firm* — DiBerardino McGovern IP Group LLC (57) ABSTRACT

A toy assembly includes: a platform configured to receive an object in a space extending from the platform; a dock configured to receive and hold a portable imaging device associated with a field of view, the dock being positioned relative to the platform such that the space extending from the platform overlaps with the field of view of the imaging device when the imaging device is received and held in the dock; a physical input configured to move in response to an applied manual force; and a movable connection between the physical input and the platform, the movable connection configured to move the platform relative to the imaging device in response to receiving a manual force.

19 Claims, 9 Drawing Sheets

(51) Int. Cl.
*G06T 17/00* (2006.01)
*A63H 33/22* (2006.01)
*H04N 5/225* (2006.01)
*A63H 33/00* (2006.01)
*A63F 9/24* (2006.01)
*A63H 3/50* (2006.01)
*A63H 13/18* (2006.01)
*A63F 13/655* (2014.01)
*A63F 13/92* (2014.01)

(52) U.S. Cl.
CPC ............... *A63H 3/50* (2013.01); *A63H 13/18* (2013.01); *A63H 33/003* (2013.01); *A63H 33/22* (2013.01); *A63H 33/26* (2013.01); *G06T 17/00* (2013.01); *H04N 5/2251* (2013.01); *A63F 2009/2402* (2013.01); *A63F 2009/2425* (2013.01); *A63F 2009/2435* (2013.01); *A63F 2009/2486* (2013.01); *A63F 2250/285* (2013.01); *A63F 2250/287* (2013.01); *A63F 2250/30* (2013.01); *A63F 2300/5553* (2013.01)

(56) References Cited

U.S. PATENT DOCUMENTS

| | | | |
|---|---|---|---|
| 4,141,176 A * | 2/1979 | Flicker | A63H 3/20 446/359 |
| 4,165,579 A * | 8/1979 | Chase | A63H 3/52 40/415 |
| 4,183,172 A * | 1/1980 | Lewis | A63H 3/50 40/415 |
| 4,216,613 A | 8/1980 | Livick | |
| 4,356,658 A * | 11/1982 | Goldfarb | A63H 3/52 40/415 |
| 4,641,831 A | 2/1987 | Hughes | |
| 4,815,961 A | 3/1989 | Kindred | |
| 5,328,400 A * | 7/1994 | Bass | A63H 3/50 428/100 |
| 5,412,890 A * | 5/1995 | Fechter | G09F 19/08 40/414 |
| 5,558,555 A | 9/1996 | Kennedy | |
| 5,816,886 A * | 10/1998 | Cusolito | A63H 5/00 434/171 |
| 5,857,119 A | 1/1999 | Borden | |
| 5,864,640 A * | 1/1999 | Miramonti | G01B 11/00 345/419 |
| 6,081,273 A | 6/2000 | Weng | |
| 6,690,156 B1 | 2/2004 | Weiner et al. | |
| 6,761,634 B1 | 7/2004 | Peterson et al. | |
| 6,766,036 B1 | 7/2004 | Pryor | |
| 6,809,728 B2 * | 10/2004 | Terauchi | G06T 1/0007 345/420 |
| 6,894,686 B2 | 5/2005 | Stamper et al. | |
| 7,295,220 B2 | 11/2007 | Zhou et al. | |
| 7,327,362 B2 | 2/2008 | Grau | |
| 7,348,963 B2 | 3/2008 | Bell | |
| 7,525,566 B2 * | 4/2009 | Horita | H04N 13/0221 348/42 |
| 7,911,503 B2 | 3/2011 | Kobayashi | |
| 7,991,220 B2 | 8/2011 | Nagai et al. | |
| 8,130,244 B2 | 3/2012 | Cooper | |
| 8,279,168 B2 | 10/2012 | Glomski et al. | |
| 8,433,130 B2 | 4/2013 | Rau | |
| 8,452,081 B2 | 5/2013 | Wang | |
| 8,473,362 B2 | 6/2013 | Pillai | |
| 8,549,418 B2 | 10/2013 | Lamarca et al. | |
| 8,602,780 B2 | 12/2013 | Rubbert | |
| 8,611,587 B2 | 12/2013 | Horovitz | |
| 8,625,854 B2 | 1/2014 | Valkenburg | |
| 8,638,364 B2 | 1/2014 | Chen et al. | |
| 8,855,366 B2 | 10/2014 | Wagner et al. | |
| 8,894,461 B2 | 11/2014 | Horovitz | |
| 9,028,315 B2 | 5/2015 | Morichau-Beauchant et al. | |
| 9,619,960 B2 | 4/2017 | Yoshimi | |
| 2001/0041064 A1 | 11/2001 | Huebner | |
| 2002/0030680 A1 | 3/2002 | Knebel et al. | |
| 2002/0050988 A1 | 5/2002 | Petrov et al. | |
| 2002/0051006 A1 * | 5/2002 | Katagiri | G01B 11/24 345/653 |
| 2002/0190982 A1 | 12/2002 | Kotcheff et al. | |
| 2003/0038801 A1 | 2/2003 | Terauchi et al. | |
| 2003/0063086 A1 | 4/2003 | Baumberg | |
| 2003/0085890 A1 | 5/2003 | Baumberg et al. | |
| 2003/0085891 A1 | 5/2003 | Lyons et al. | |
| 2003/0091227 A1 | 5/2003 | Chang et al. | |
| 2003/0202691 A1 | 10/2003 | Beardsley | |
| 2003/0218607 A1 | 11/2003 | Baumberg | |
| 2004/0155877 A1 | 8/2004 | Hong et al. | |
| 2004/0157527 A1 | 8/2004 | Omar | |
| 2005/0068523 A1 | 3/2005 | Wang | |
| 2005/0068544 A1 | 3/2005 | Doemens et al. | |
| 2005/0286091 A1 | 12/2005 | Harel | |
| 2006/0013470 A1 | 1/2006 | Nagatsuka et al. | |
| 2007/0171220 A1 | 7/2007 | Kriveshko | |
| 2007/0237908 A1 | 10/2007 | Garnett | |
| 2008/0298672 A1 | 12/2008 | Wallack et al. | |
| 2008/0306709 A1 | 12/2008 | Fisker | |
| 2009/0033655 A1 | 2/2009 | Boca et al. | |
| 2009/0279784 A1 | 11/2009 | Arcas et al. | |
| 2010/0332196 A1 | 12/2010 | Fisker | |
| 2011/0004331 A1 | 1/2011 | Cinader, Jr. et al. | |
| 2011/0093274 A1 | 4/2011 | Lee | |
| 2011/0211045 A1 | 9/2011 | Bollano | |
| 2011/0298922 A1 | 12/2011 | Horovitz et al. | |
| 2012/0116728 A1 | 5/2012 | Shear | |
| 2012/0281087 A1 | 11/2012 | Kruse | |
| 2012/0295703 A1 | 11/2012 | Reiche et al. | |
| 2013/0123009 A1 | 5/2013 | Maharbiz et al. | |
| 2013/0215148 A1 | 8/2013 | Antonyuk et al. | |
| 2013/0278725 A1 | 10/2013 | Mannan | |
| 2013/0318261 A1 * | 11/2013 | Cheng | G06F 13/385 710/62 |
| 2014/0028712 A1 | 1/2014 | Keating et al. | |
| 2014/0085424 A1 | 3/2014 | Buchanan | |
| 2014/0098991 A1 | 4/2014 | Yang | |
| 2014/0153066 A1 | 6/2014 | Booppanon | |
| 2014/0329598 A1 | 11/2014 | Horovitz et al. | |
| 2015/0209664 A1 | 7/2015 | Haseltine | |

FOREIGN PATENT DOCUMENTS

JP          2004-127239          4/2004
WO     WO2015185629 A2     12/2015

OTHER PUBLICATIONS

Wohl, "Archive for the '3D Scanning' Category," published Feb. 17, 2014, captured Sep. 4, 2014, http://www.makerbot.com/blog/category/scanner/3d-scanning/, 26 pages.

"3D Scanners: A Guide to 3D Scanner Technology," captured Sep. 4, 2014, http://www.rapidform.com/3d-scanners/, 3 pages.

MakerBot Unveils the Maker Bot Digitizer Desktop 3D Scanner, MakerBot Industries, LLC, Aug. 22, 2013, with MakerBot Digitizer Desktop 3D Scanner User Manual, as provided by the Korean Intellectual Property Office (KIPO) on Dec. 2, 2015, 77 pages.

International Search Report & Written Opinion, equivalent International Application No. PCT/US2015/049162, dated Nov. 30, 2015, 13 pages.

Official Action, counterpart Canadian Application No. 2,960,816, dated Mar. 7, 2018, 6 pages total.

Partial Supplementary European Search Report, counterpart European Application No. 15840576.1, dated Feb. 23, 2018, 15 pages total.

Extended European Search Report, counterpart European Application No. 15840576.1, dated Jun. 25, 2018, 16 pages total.

\* cited by examiner

TOY SYSTEM WITH MANUALLY OPERATED SCANNER

CROSS-REFERENCE TO RELATED APPLICATIONS

This application claims the benefit of U.S. Provisional Application No. 62/048,789, filed on Sep. 10, 2014 and titled TOY SYSTEM WITH MANUALLY OPERATED SCANNER, which is incorporated herein by reference in its entirety, and the benefit of U.S. Provisional Application No. 62/127,255, filed on Mar. 2, 2015 and titled TOY SYSTEM WITH MANUALLY OPERATED SCANNER, which is incorporated herein by reference in its entirety.

TECHNICAL FIELD

This disclosure relates to a toy system with a manually operated scanner.

BACKGROUND

Persons of all ages enjoy playing and interacting with toys. A computer model of a three-dimensional object can be made by imaging the object at various angles and processing the images in a separate environment.

SUMMARY

In one general aspect, a toy assembly includes: a platform configured to receive an object in a space extending from the platform; a dock configured to receive and hold a portable electronic device, the portable electronic device including at least one electronic processor, an electronic storage coupled to the at least one electronic processor, and an imaging device associated with a field of view, the dock being positioned relative to the platform such that the region extending from the platform overlaps with the field of view of the imaging device when the portable electronic device is received and held in the dock; a crank configured to move in response to manual manipulation by an operator; and a gear assembly coupled to the crank and the platform, the gear assembly configured to transfer a motion of the crank to the platform such that the platform moves relative to the imaging device in response to operation of the crank.

Implementations can include one or more of the following features. The portable electronic device can include a smart phone.

The platform can include a lip at a perimeter of the platform, and the lip can include one or more symbols. The symbols can be configured to be imaged by the imaging device.

In another general aspect, a toy assembly includes: a platform configured to receive an object in a space extending from the platform; a dock configured to receive and hold a portable imaging device associated with a field of view, the dock being positioned relative to the platform such that the space extending from the platform overlaps with the field of view of the imaging device when the imaging device is received and held in the dock; a physical input configured to move in response to an applied manual force; and a movable connection between the physical input and the platform, the movable connection configured to move the platform relative to the imaging device in response to receiving a manual force.

Implementations can include one or more of the following features. The movable connection can include a gear assembly coupled between the physical input and the platform.

The movable connection can include a motor.

The physical input can be one of a crank, a button, and a switch.

The platform can include a lip at a perimeter of the platform, and the lip can include one or more symbols. The imaging device can be part of a portable electronic device that includes an electronic storage and a one or more electronic processors, and the electronic storage can include instructions, that when executed, cause the one or more electronic processors to obtain an image of the space extending from the platform. When executed, the instructions can cause the one or more electronic processors to obtain a plurality of images of the space extending from the platform in response to imaging one of the symbols at a first time. A plurality of images of the space extending from the platform can be obtained until the one of the symbols is imaged by the imaging device at a second time.

When executed, the instructions can cause the one or more electronic processors to obtain a first image of the space extending from the platform in response to imaging one of the symbols at a first time, and obtain a second image of the space extending from the platform in response to imaging another of the symbols at a second time. When executed, the instructions can cause the one or more electronic processors to generate a virtual environment from the first and second images. When executed, the instructions can cause the one or more processors to identify a characteristic of the object from the first and second images.

The toy assembly also can include a background that defines a side of the space that extends in a region adjacent to the platform, the background being on a side of the platform that is opposite to the dock.

The toy assembly also can include a base that receives the platform, and the background is a single rigid piece connected to the base.

In another general aspect, a system includes a portable electronic device, the portable electronic device including a housing configured to be held by a user, an imaging device in the housing and associated with a field of view, at least one electronic processor, and an electronic storage coupled to the at least one electronic processor. The system also includes a toy assembly including a platform configured to receive an object in a space extending upward from the platform; a dock configured to receive and hold the portable electronic device, the dock being positioned relative to the platform such that the region extending upward from the platform overlaps with the field of view of the imaging device when the portable electronic device is received and held in the dock; a crank configured to move in response to manual manipulation by an operator; and a gear assembly coupled to the crank and the platform, the gear assembly configured to transfer a motion of the crank to the platform such that the platform moves relative to the imaging device in response to operation of the crank.

In another general aspect, a trigger is detected; a first image of an object received in a space that extends from a platform of a toy system is obtained with an imaging device of a portable electronic device; the platform of the toy system is moved in response to application of a manual force to move the object relative to the imaging device; a second image of the object is obtained at a second time, a position of the object relative to the imaging device being different at the second time than at the first time; a virtual environment is generated, the virtual environment including a representation of the object based on the first and second images; and the virtual environment is visually presented at the portable electronic device.

Implementations can include one or more of the following features. The representation of the object can include a three-dimensional (3D) model.

Detecting the trigger can include detecting a representation of a symbol in an image obtained by the portable electronic device. The second image can be obtained in response to detecting a second trigger. Detecting the second trigger can include detecting a representation of a second symbol in an image obtained by the portable electronic device.

Detecting the trigger can include detecting a trigger generated external to the portable electronic device. Detecting the trigger can include detecting a sound generated by a user of the portable electronic device. Detecting the trigger can include detecting a sound. Visually presenting the virtual environment can include visually presenting the virtual environment on a display of the portable electronic device.

The representation of the object in the virtual environment that is visually presented can be modified in response to user manipulation of the portable electronic device. Modifying the representation of the object in the virtual environment can include one or more of moving the representation of the object in the visually presented virtual environment to a different portion of the display, overlaying accessories on the representation of the object, or placing the representation of the object in a computerized game.

Implementations of any of the techniques described above can include a toy system, a method, a process, a system, or computer instructions encoded on a non-transitory computer-readable medium. The details of one or more implementations are set forth in the accompanying drawings and the description below. Other features will be apparent from the description and drawings, and from the claims.

DESCRIPTION

A toy system with a manually operated scanner is disclosed. The toy system allows users, including child users, to easily scan an object of their choosing and generate a virtual environment that includes a representation of the object. The representation can be a three-dimensional (3D) representation based on a 3D computer model that is generated from data collected during the scan of the object. The 3D computer model can be applied to and/or used in a variety of electronic user experiences. Thus, the toy system offers the ability to easily generate a 3D computer model and use the 3D computer model in a virtual environment from within the toy system.

Figure 1:
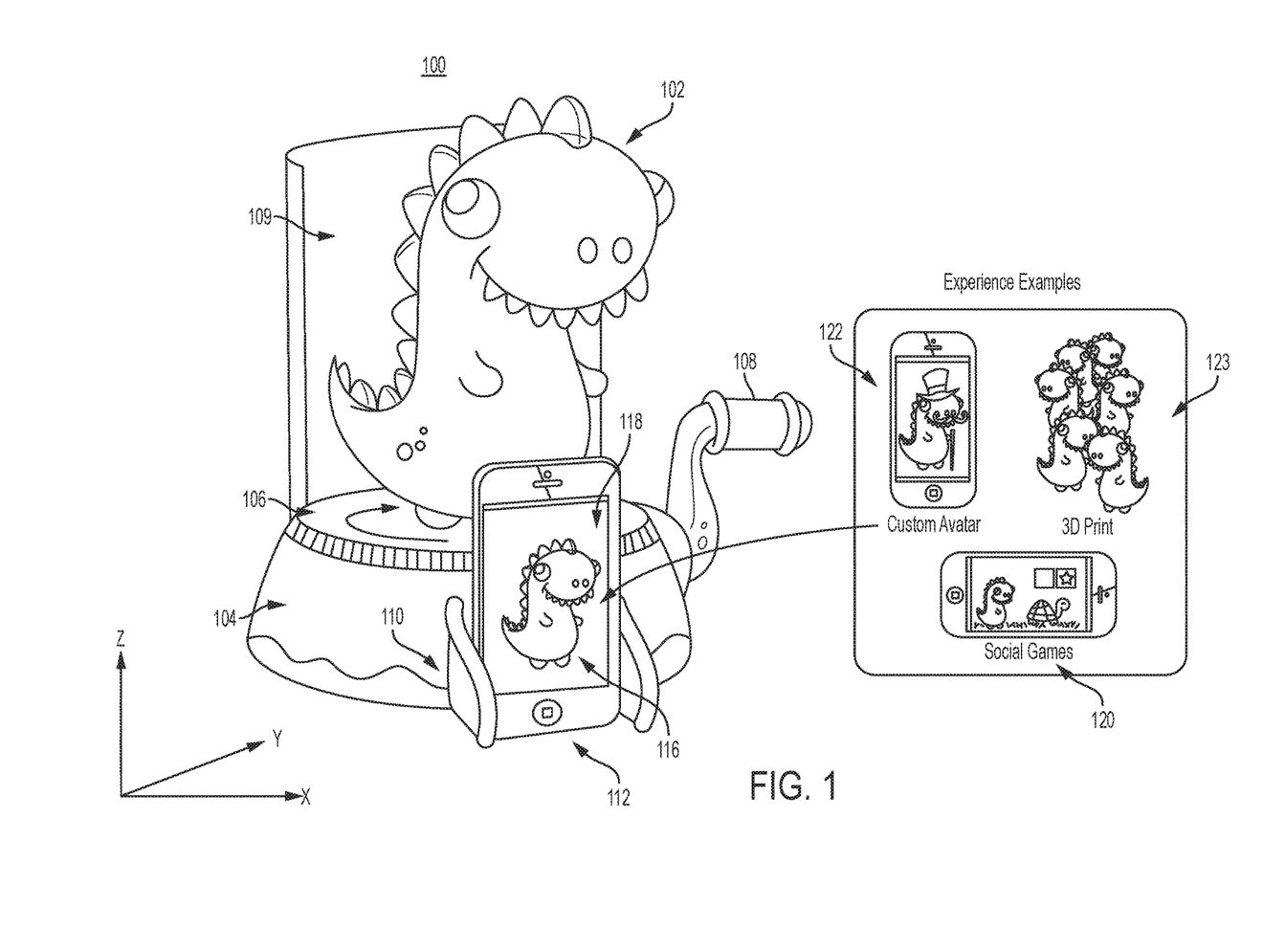
FIG. 1 is a perspective view of an exemplary toy system.

FIG. 1 is a perspective view of an exemplary toy system 100. The toy system 100 is a manually operated, child-friendly three-dimensional (3D) scanner that generates a 3D computer model of an object 102. The toy system 100 includes a base 104, a turntable 106 received in or on the base 104, a hand crank 108 that is manually operable by a user to cause the turntable 106 to rotate, a backdrop 109, and a dock 110 that receives and holds a portable electronic device 112. The portable electronic device 112 includes an imaging device (such as a camera) that images the object 102.

The object 102 is received on the turntable 106 in a space 115, which extends from the turntable 106 and is partially bound by the backdrop 109. The object 102 can be a toy, an object created by the user, such as a clay figure created by the user, or any other item that fits in the space 115. The clay figure created by the user may be a figure or other object made from a modelling compound. Images obtained by the imaging device as the object 102 moves while the turntable 106 moves are used to form a 3D computer model of the object 102. In the example of FIG. 1, a visual representation 116 of the 3D computer model is shown on a display 118 of the portable electronic device 112.

In addition to generating the 3D computer model, the toy system 100 allows the user to manipulate and/or use the 3D model. For example, the toy system 100 can include a computer program, or other executable electronic instructions, that allow the user to interact with the visual representation 116 by swiping a finger on the display 118 to move the visual representation 116 in a way that corresponds with the motion of the user's finger. Additionally or alternatively, the user may interact with the computer program to cause the visual representation 116 to be used in a game 120, to create a custom avatar 122 based on an accessorized version of the 3D computer model, and/or use the 3D model to generate a physical representation of the 3D computer model through, for example, a separate additive manufacturing or rapid prototyping process. Further, in some implementations, the user can interact with the computer program to shape, define, and customize a terrain or background in which an avatar based on the 3D computer model is present.

The images from the imaging device can be used to identify the object 102 and/or a characteristic of the object 102 instead of or in addition to generating a 3D computer model. For example, in some implementations, the images obtained by the imaging device are analyzed by the toy system to identify features associated with the object 102. For example, the object 102 can be a canister of color-tinted clay (such as a modelling compound) or Play Doh (available from Hasbro, Inc. of Pawtucket, R.I.), and the images obtained by the imaging device can be used to identify the color of the Doh (for example, the modelling compound) that is in the canister (from, for example, a label on the canister). The identified color of the Doh can be used to assign, identify, or determine attributes of a character used in a digital game. For example, the color of the Doh can be used to identify unique or particular creatures or animals, items, and/or functionality associated with the character. Thus, the images obtained by the imaging device can be used in a manner that is in addition to or instead of generating a 3D computer model of the object 102, with the results of the imaging being able to enhance the user's experience with the toy system 100.

In this manner, the toy system 100 provides an integrated environment in which a user, including a child user, can create and use a 3D computer model of an object of their choosing. Additionally, the toy system 100 is manually operated with the hand-crank 108 and does not require complex electronic control of the turntable 106.

Figure 2:
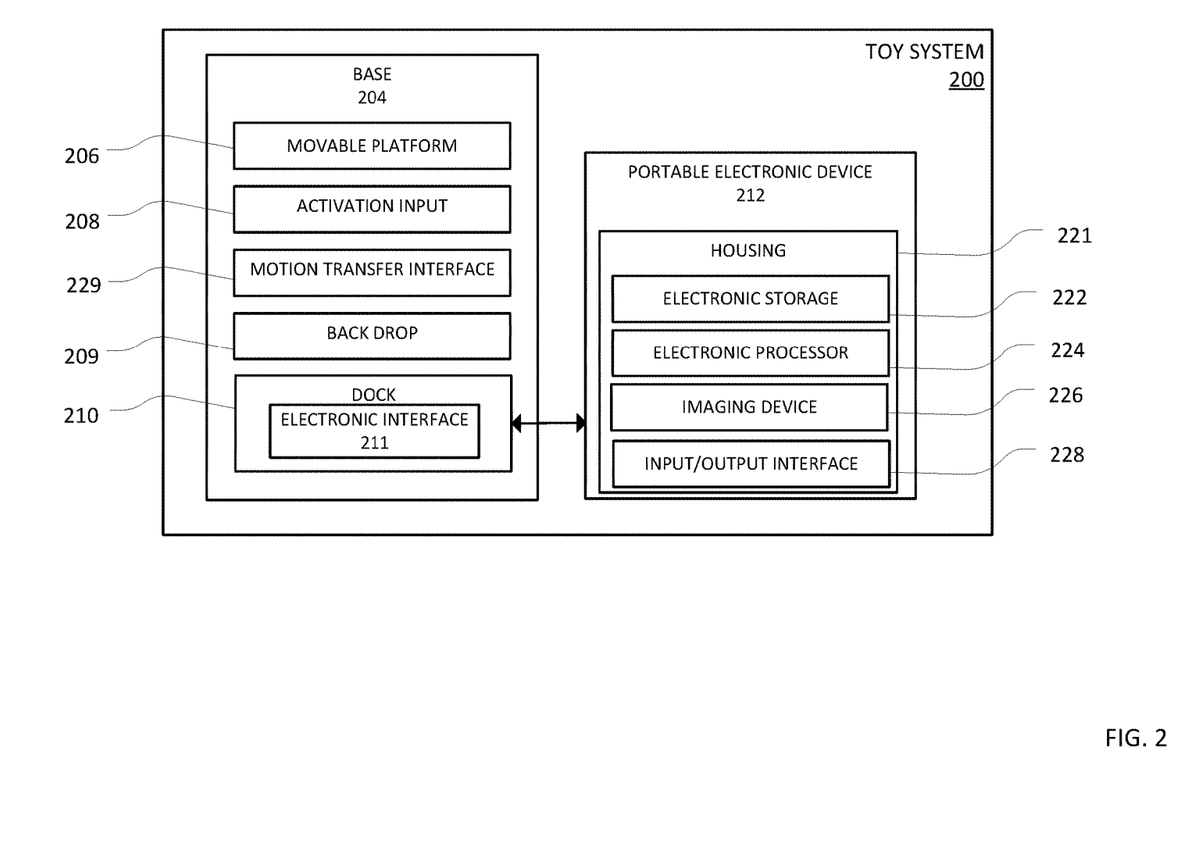
FIG. 2 is a block diagram of another exemplary toy system.

Referring to FIG. 2, a block diagram of another exemplary toy system 200 is shown. The toy system 200 includes a dock 210 that receives and holds, for example, a portable electronic device 212, in a fixed position. The portable electronic device 212 includes a housing 221, an electronic storage 222, an electronic processor 224, an imaging device 226, and an input/output (I/O) interface 228.

The portable electronic device 212 can be, for example, a smart phone, such as an iPhone available from Apple Inc. of Cupertino, Calif. The imaging device 226 can be, for example, a camera. The housing 221 of the portable electronic device 212 is configured to be held in the hand of a user. The housing 221 also receives and holds the electronic storage 222, the electronic processor 224, the imaging device 226, and the I/O interface 228 in a fixed spatial relationship to each other. Thus, when the portable electronic device 212 is received in the dock 210, the imaging device 226 is held in a fixed relationship to the movable platform 206.

The electronic storage 222 can be volatile memory, such as RAM, or non-volatile memory. In some implementations, and the electronic storage 222 can include both non-volatile and volatile portions or components. The electronic processor 224 may be one or more processors suitable for the execution of a computer program such as a general or special purpose microprocessor, and any one or more processors of any kind of digital computer. Generally, a processor receives instructions and data from a read-only memory or a random access memory or both.

The electronic processor 224 can be any type of electronic processor and can be more than one electronic processor. The electronic storage 222 stores instructions, perhaps as a computer program, that, when executed, cause the processor 224 to communicate with other components in the portable electronic device 212. For example, the instructions can be instructions to cause the electronic storage 222 to store images obtained by the imaging device 226 and to form a 3D computer model of an object from the images. The instructions can be instructions that cause the electronic processor 224 to display the 3D computer model on a display that is included in the I/O interface 228. In some implementations, the instructions include instructions that accept the user's tactile interactions with the display of the portable electronic device 212 as inputs. For example, the instructions can cause the visually presented 3D model to move on the display in response to the user tapping on the display. Additionally, the electronic storage 222 can store data, such as a digital representation of 3D computer model.

The base 204 includes the movable platform 206, an activation input 208, a motion transfer interface 229, a back drop 209, and the dock 210, which includes an electronic interface 211. The motion transfer interface 229 transfers a user-initiated motion of the activation input 208 to the movable platform 206. The movable platform 206 can be, for example, a turntable that rotates relative to the imaging device 226. In some implementations, the turntable has a circular cross section with a diameter of 4.5-5.5 inches (11.4-14 cm). In some implementations, the moving platform 206 is limited to only one type of movement. For example, in implementations in which the moving platform 206 is a turntable such as the turntable 106 of FIG. 1, the motion can be limited to a single direction in the x-y plane (that is, the turntable 106 can be limited to rotating in the x-y plane in either the counterclockwise or clockwise direction).

The user can operate the activation input 208 by, for example, applying a manual, physical force to the activation input 208. The activation input 208 can be any physical input that moves in response to application of a manual, physical force. For example, the activation input 208 can be a hand-crank (such as the crank 108 of FIG. 1). In this example, applying force to the crank 208 moves the crank through a circle.

The activation input 208 can have other forms. For example, the activation input 208 can be a push-button or a switch, or a combination of such devices. In some implementations, the activation input 208 is a string, tab, or other mechanical object that can be grasped by an end user. In this example, the activation input 208 is connected to a spring. Pulling on the activation input 208 causes the spring to expand or compress, causing the movable platform 206 to move.

The motion of the activation input 208 is transferred, directly or indirectly, to the movable platform 206 through the motion transfer interface 229, causing the platform 206 to move. The motion transfer interface 229 can be any movable structure that couples the activation input 208 to the movable platform 206 such that the movable platform 206 moves in response to a force being applied to the activation input 208. For example, the motion transfer interface 229 can be a set of gears that transfers a motion of the activation input 208 to the platform 206. The set of gears can have a gear ratio, and the ratio can be adjustable by a user of the toy system 200. The motion transfer interface 229 allows the motion of the activation input 208 to be transferred to the movable platform 206 to move smoothly relative to the base 204.

The motion transfer interface 229 can be an electric or mechanical motor that drives the motion of the platform 206 in response to a force being applied to the activation input 208. In these implementations, the motion of the activation input 208 is transferred to the movable platform 206 indirectly in that the motion of the activation input 208 causes the motor to begin to operate, and the motor can drive the motion of the platform 206 even if the force is removed from the activation input 208. In other words, the activation input 208 can be used to turn the motor ON (and also to turn the motor OFF), but the motor can cause the platform 206 to move even when the activation input 208 itself is not in motion and not receiving a force.

The base 204 also can include the backdrop 209. The backdrop 209 can have a surface with a contour that follows the shape of the movable platform. For example, in implementations in which the movable platform 206 is a turntable with a circular cross section, the backdrop 209 can be in the shape of a partial cylinder. The backdrop 209 partially surrounds a space that extends from the movable platform 206 and receives an object to be scanned.

The dock 210 receives and holds the portable electronic device 212. Additionally, when the portable electronic device 212 is in the dock 210, the portable electronic device 212 can couple to the electronic interface 211. The electronic interface 211 can be any interface capable of transferring data and/or power between the base 204 and the portable electronic device 212.

The dock 210 can be sized to fit any portable electronic device. In some implementations, the dock 210 can include a removable insert that can be used to change the size of the opening in the dock 210 so that the dock 210 can receive a variety of portable electronic devices of different sizes. The dock 210 can be designed with a flexible insert that expands or contracts to form to the shape of the portable electronic device 212.

Figure 3A:
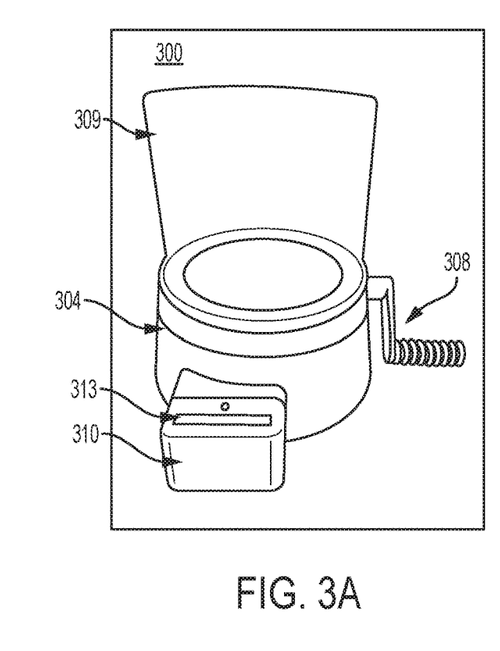
FIGS. 3A-3C are perspective views of another exemplary toy system.
Figure 3B:
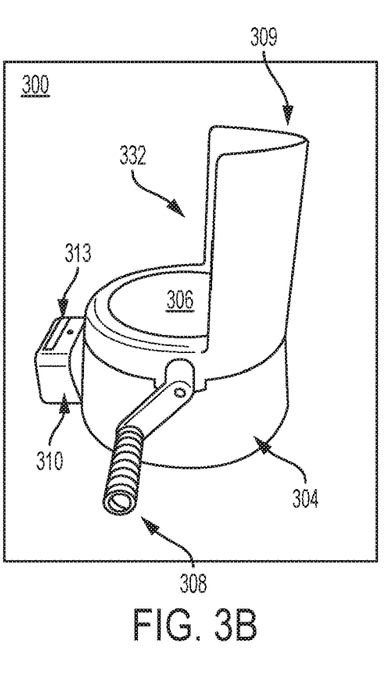
Figure 3C:
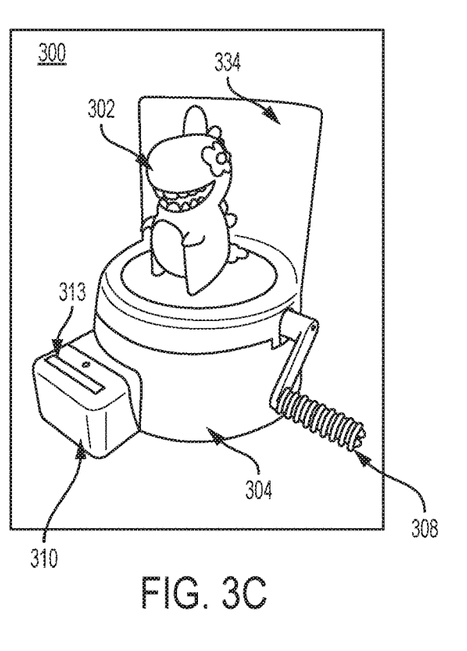

Referring to FIGS. 3A-3C, front, side, and front-side perspective views, respectively, of an exemplary toy system 300 are shown. The toy system 300 includes a base 304 that holds a turntable 306 and includes a backdrop 309 and a dock 310. The backdrop 309 defines a partial boundary of a space 332 that extends from the turntable 306 and receives an object 302. The backdrop 309 has a contour 334 that follows the shape of the peripheral region of the turntable 306. Additionally, the backdrop 309 limits the size of the objects that can be received in the space 332. In the example toy system 300, the backdrop 309 and the base 304 are a single piece.

The base 304 also includes a manually operated crank 308, the movement of which causes the turntable 306 to rotate. In some implementations, the turntable 306 can rotate in the x-y plane in either the counterclockwise or clockwise direction. In other implementations, the motion of the turntable 306 can be limited or restricted to only one direction (clockwise or counterclockwise in the x-y plane). The dock 310 includes a slot 313 that receives and holds a portable electronic device (such as the device 212 of FIG. 2)

The turntable 306 and the backdrop 309 can be made out of any durable material. For example, the turntable 306 and the backdrop 309 can be made out of molded plastic. Additionally, either or both of the turntable 306 and the backdrop 309 can have a matte finish (a non-glossy finish that reflects light diffusely) to reduce or eliminate the formation of shadows formed by the object 302, the backdrop 309, and/or items in the vicinity of the system 300. Further, the matte finish can reduce or eliminate glare caused by light that impinges on the turntable 306 and/or the backdrop 309. The matte finish thus allows the object 302 to receive a consistent amount of light while being imaged by a portable electronic device that is held in the dock. By reducing or eliminating shadows and glare, a consistent background is provided, allowing a portable electronic device that is held in the dock can obtain more accurate images.

In some implementations, the turntable 306 and/or the backdrop 309 can be a color that is different from any color expected to be in the object 302, or a color that, if present in the object 302, is typically present in only on small regions of surface of the object 302. This ensures that the object 302 can be distinguished from the backdrop 309 and the turntable 306.

Figure 4A:
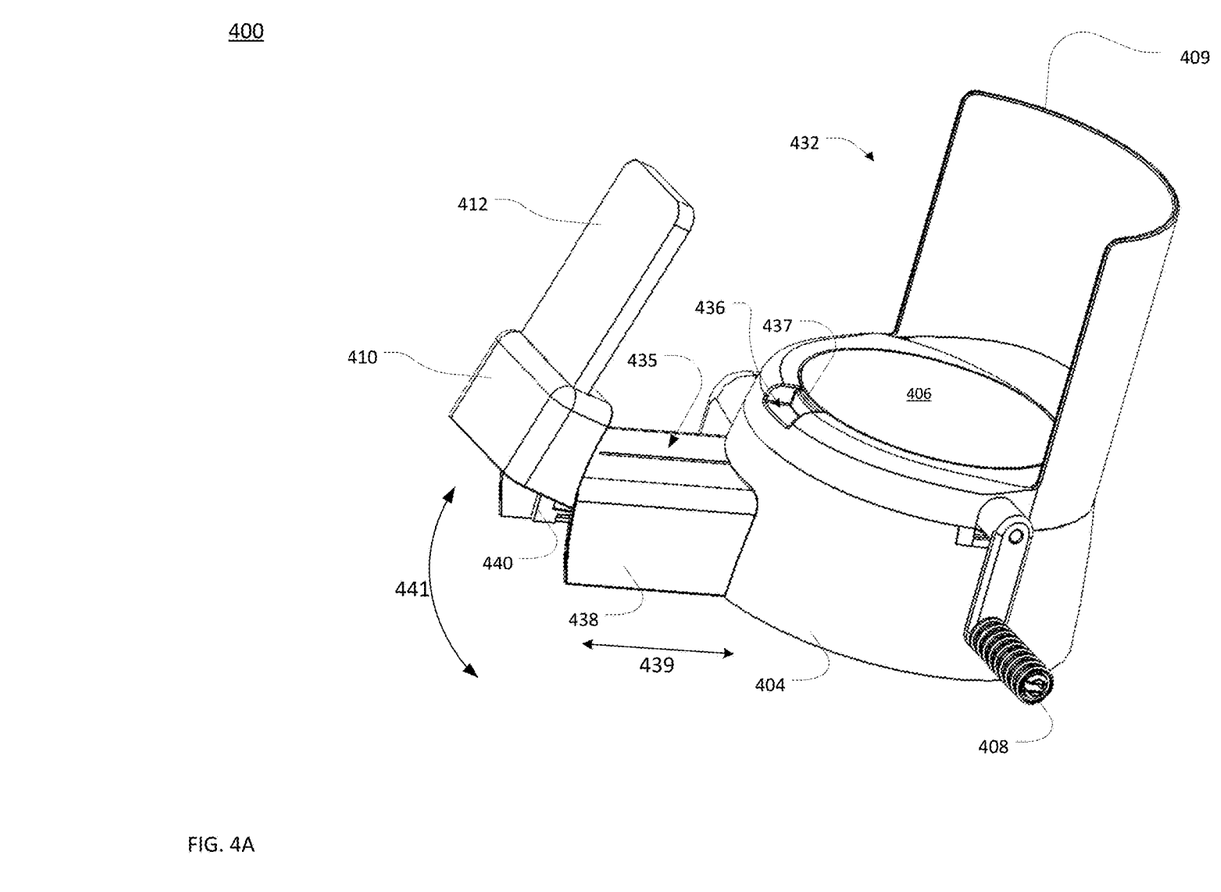
FIGS. 4A-4C are perspective views of another exemplary toy system.
Figure 4B:
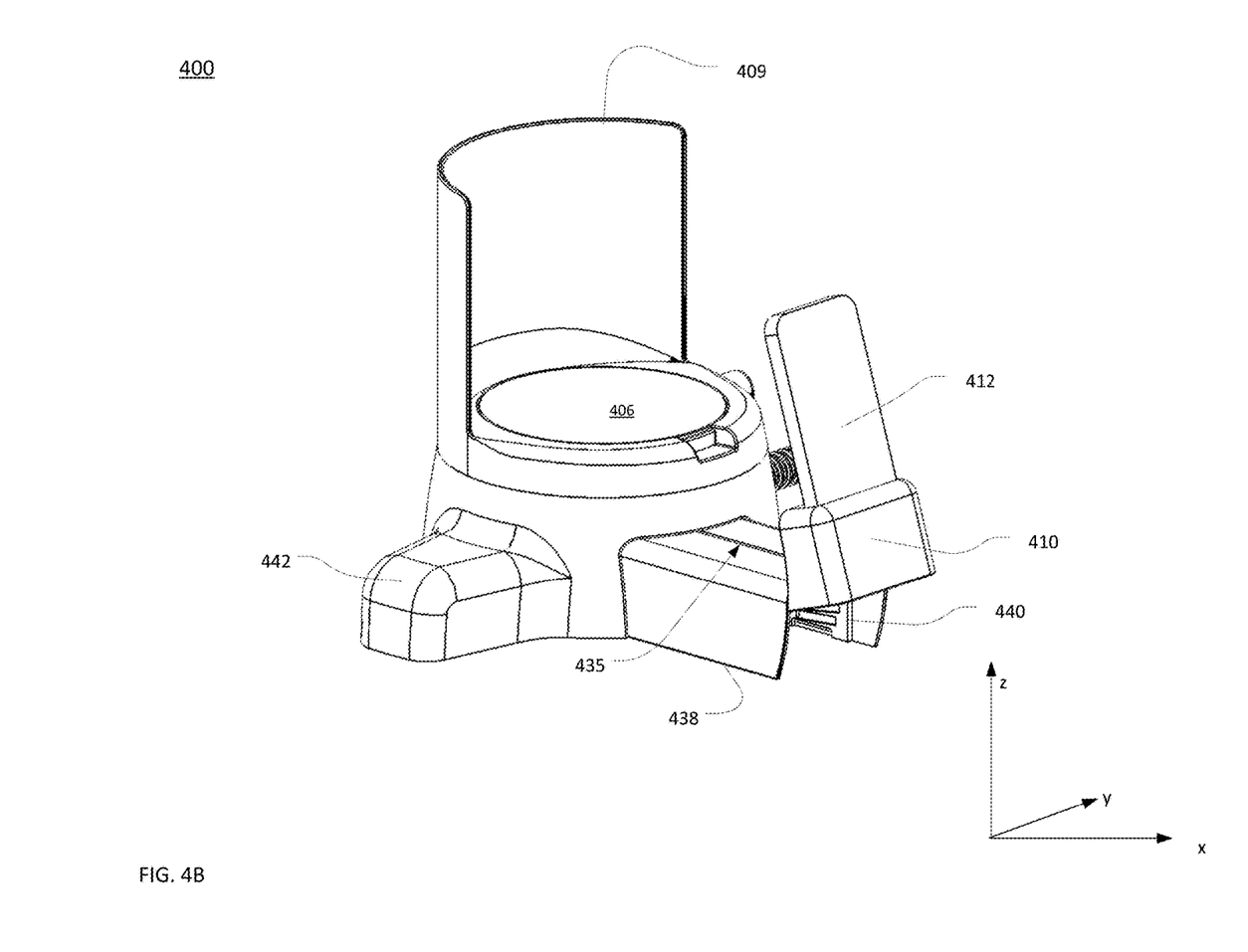
Figure 4C:
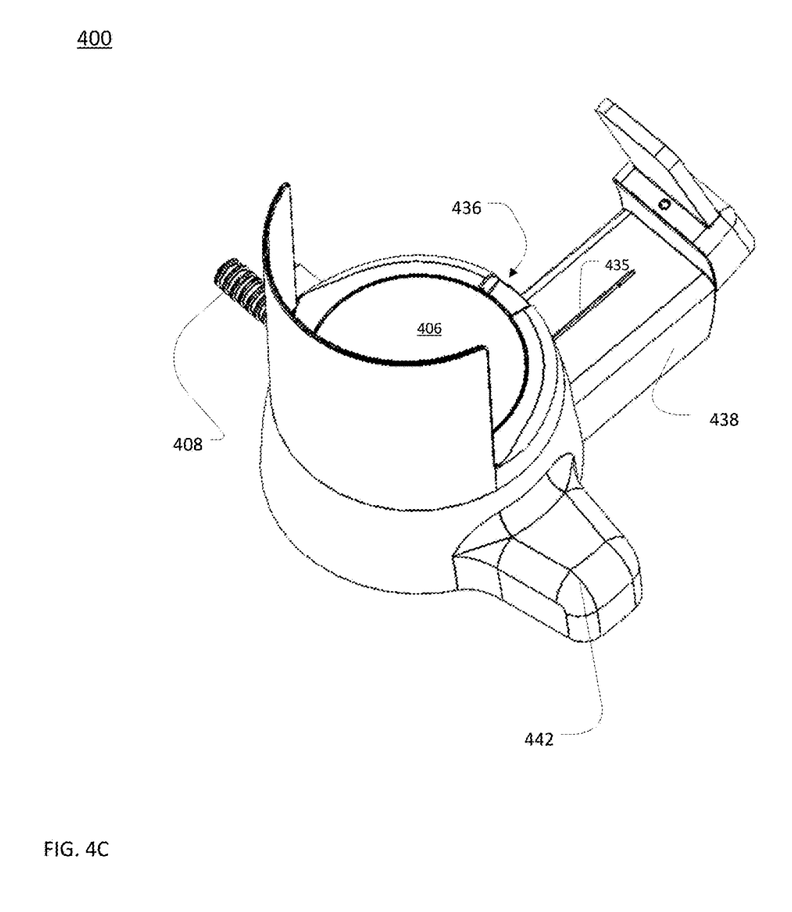

Referring to FIGS. 4A-4C, right side, left side, and top-side perspective views, respectively, of another exemplary toy system 400 are shown. The toy system 400 includes a base 404, a turntable 406, a dock 410 that receives and holds the portable electronic device 212 (FIG. 2), a manually operable crank 408, the operation of which causes the turntable 406 to move relative to the portable electronic device 212, and a backdrop 409. The turntable 406 and the backdrop 409 define a space 432 that extends from the turntable 406 and receives an object (such as the object 102 of FIG. 1).

The toy system 400 includes an arm 438 that is connected to the dock 410. In some implementations, the arm 438 is a fixed and rigid arm that remains at the same distance relative to the turntable 406 and the space 432. The arm 438 can be permanently attached to the base 404. For example, the arm 438 and the base 404 can be a single piece. In these implementations, the arm 438 may be attached to the base 404 in any way such that the arm 438 is not removable during ordinary use. For example, the arm 438 can be attached to the base 404 with a permanent adhesive or other attachment mechanism that is not intended to allow the base 404 and the arm 438 to separate.

In some implementations, the arm 438 can be repeatedly removed from and/or attached to the base 404 without damaging the base 404 or the arm 438. In these implementations, the system 400 can include a plurality of arms that are sized for use with different imaging devices or in different imaging scenarios. In these implementations, the plurality of arms are interchangeable and any one of the arms can be inserted into the base 404.

In some implementations, the arm 438 may be positionable relative to the base 404. In these implementations, the base 404 and/or the arm 438 can include a mechanism that holds the arm 438 in one or more fixed and predetermined locations relative to the base 404. For example, the arm 438 can include a slot 435 that receives a cooperating tab that is formed on the base 404, and, when joined, the slot 435 and tab can hold the base 404 and the arm 438 in a fixed spatial relationship with each other. In some implementations, the arm 438 can be adjusted relative to the base 404 by sliding the arm 438 along a direction 439, with the arm 438 locking into place at one or more locations along the direction 439.

Additionally, in some implementations the toy system 400 includes a height grating 440 that allows the dock 410 to be positioned along an arc 441 and to be held at various predetermined positions relative to the turntable 406. The height grating 440 is configured such that the dock 410 is held in a fixed and stationary manner in each of the various predetermined positions relative to the turntable 406. In implementations that include either or both of the height grating 440 and an adjustable arm 438, the arm 438 and the height grating 440 allow the portable electronic device 212 to be received and held in the dock 410 to be more precisely positioned by the user.

Furthermore, because the position of the arm 438 and the dock 410 are fixed relative to the base 404 and remain stationary during data capture by the portable electronic device 212, the imaging device 226 of the portable electronic device can be positioned relative to the turntable 406 such that the imaging device 226 can obtain images of the space 432 and the lip 437 without the user performing a complex alignment procedure and without complicated imaging software to adjust the images collected by the imaging device 226.

Thus, the arm 438 can be a fixed arm that remains in a particular spatial position relative to the base 404 as determined at the time of manufacture, or the arm 438 can be positionable and/or swappable by the end user of the system 400. In other words, the arm 438 is, or is capable of being, locked into a particular position relative to the base 404 such that the imaging device 226, which is held by the arm 438, is stationary and held in a fixed position relative to the space 432 while acquiring data from the space 432. In implementations that have an adjustable arm 438 and/or an adjustable dock 410, the possible relative spatial locations of the base 404 and the arm 438 and/or the adjustable dock 410 are predetermined and are thus consistent from use-to-use of the system 400.

Further, the toy system 400 includes a foot 442 that provides additional support to the base 404. The base 404 also defines a notch 436 that exposes a portion of a side or lip 437 of the turntable 406. As discussed with respect to FIGS. 5A and 5B, the notch 436 allows the imaging device 226 to image a symbol on the turntable 406. The notch 436 can be, for example, rectangular or square in shape. A notch that is a square can provide a greater height or width than a rectangle, and can allow improved imaging of the symbol.

Figure 5A:
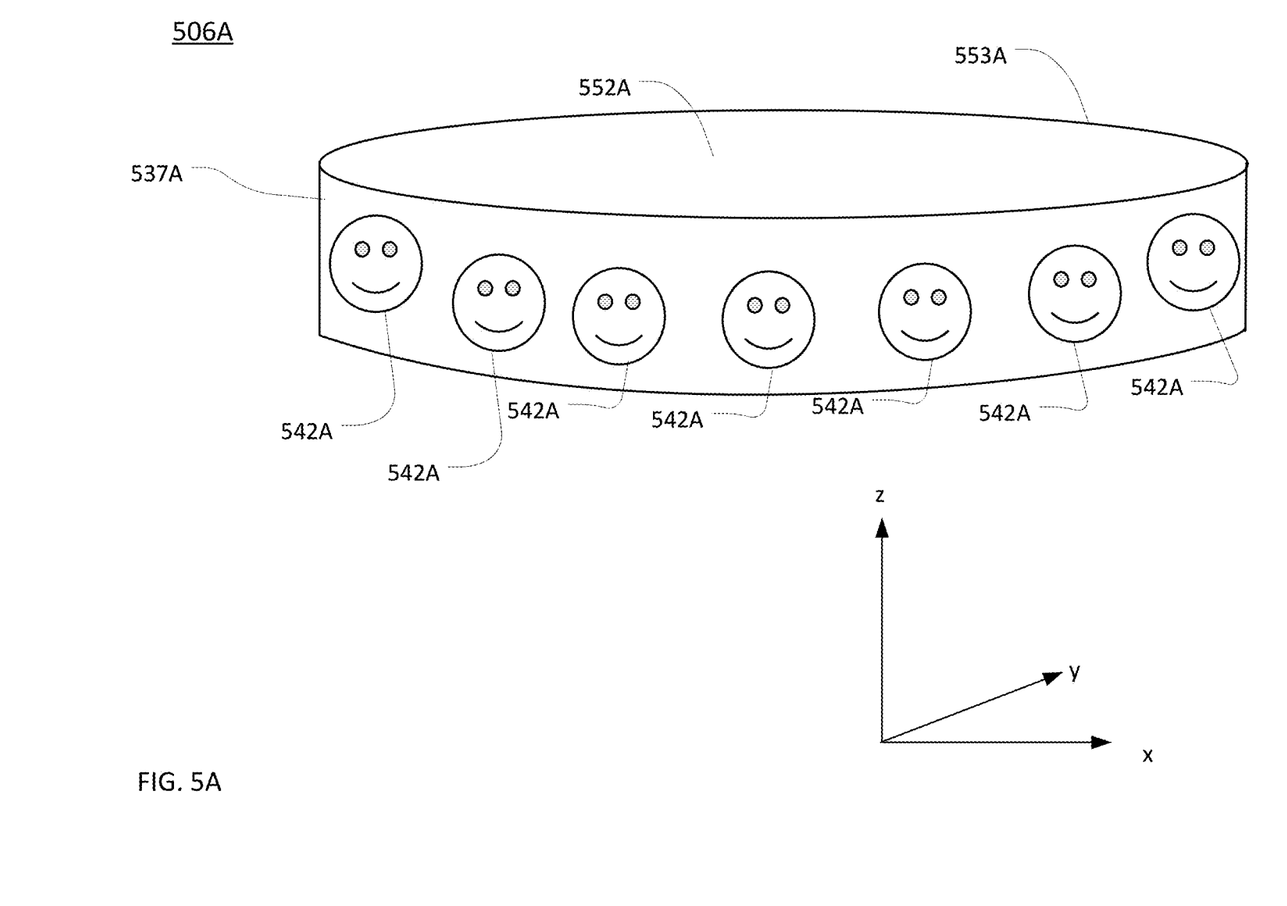
FIGS. 5A and 5B are perspective views of exemplary turntables for the toy system of FIGS. 4A-4C.
Figure 5B:
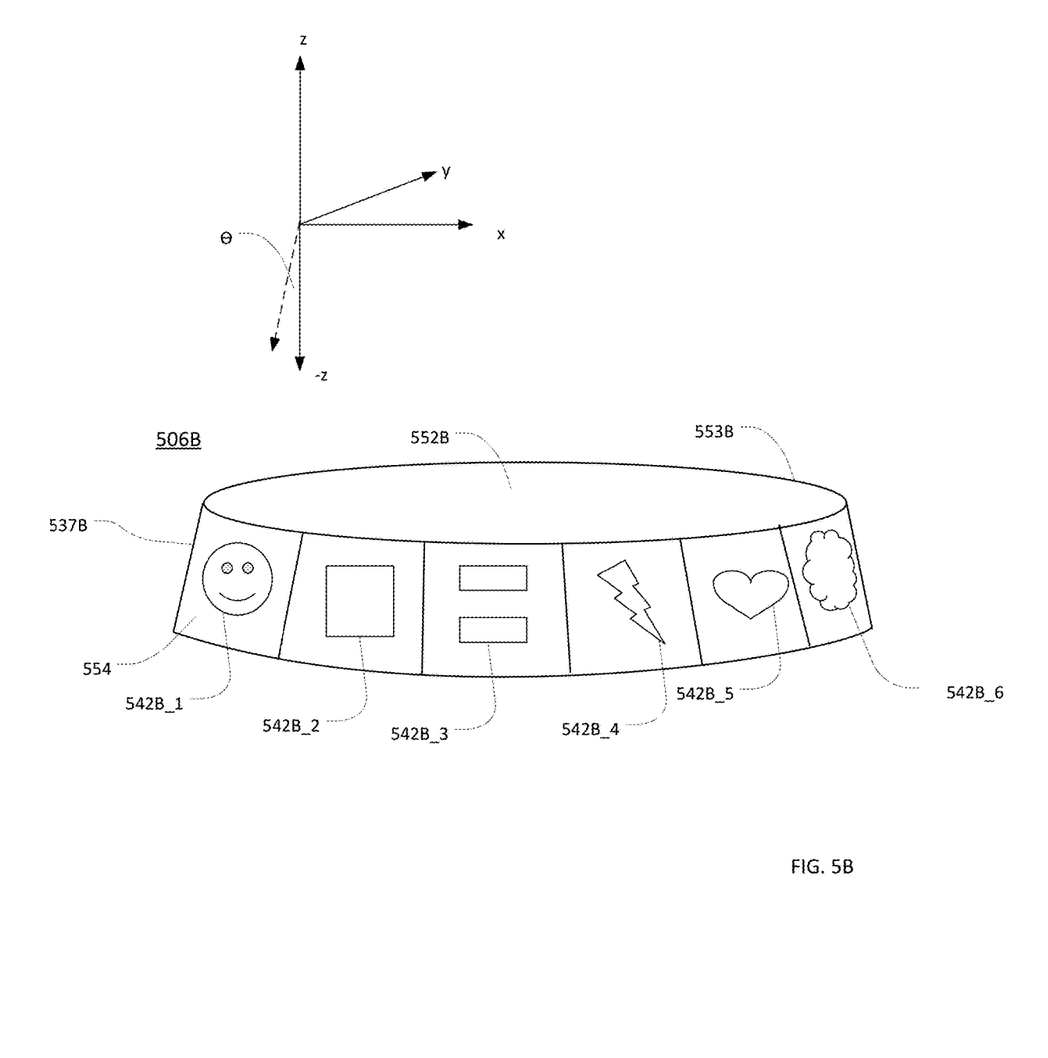

Referring also to FIGS. 5A and 5B, perspective views of a turntable 506A and a turntable 506B, respectively, are shown. Either of the turntables 506A and 506B can be used in the system 400 as the turntable 406, or as a turntable in a similar system.

The turntable 506A includes a top portion 552A, on which an object to be scanned can rest, and a lip 537A. At least part of the top portion 552A extends in the x-y plane. A plurality of symbols 542A are engraved, painted, drawn, or otherwise placed on a lip 537A of the turntable 506A. The lip 537A extends from a perimeter 553A of the top portion 552A of the turntable 506A in the −z direction. The symbols 542A are placed at regular spatial intervals on the lip 537, and the centers of the symbols 542A can be circumferentially equidistant from each other. The symbols 542A are imagable in that images of the lip 537A obtained by the imaging device 226 when one or more of the symbols 542A are in the field of view of the imaging device 226 include a representation of the symbol 542A. When the turntable 506A moves such that one of the symbols 542A coincides with the notch 436 (FIGS. 4A-4C), that one symbol is positioned to be imaged by the imaging device 226 of the portable electronic device 212. In the example of FIG. 5A, each of the symbols 542A has the same design. In other examples, such as the example shown in FIG. 5B, some or all of the symbols have different designs.

Referring to FIG. 5B, the example turntable 506B includes a top portion 552B, at least part of which extends in the x-y plane, and a lip 537B that extends from a perimeter 553B of the top portion 552B. The lip 537B extends from the perimeter 553B at an angle (θ), which can be any angle other than zero (0) degrees (°) relative to the −z direction, and facets 554 are formed on the lip 537B. The facets 554 are planar surfaces that extend from the perimeter 553B at the angle (θ) relative to the −z direction.

Symbols 542B_1 to 542B_n are engraved, painted, drawn, or otherwise placed on the lip 537B. In the example shown in FIG. 5B, one symbol is formed on one of the facets 554. The lip 537B can include any number of symbols. In the example of FIG. 5B, six (6) of the symbols 542B_1 to 542B_n are shown, and additional symbols can be on portions of the lip 537B that are not shown in FIG. 5B.

Each of the symbols 542B_1 to 542B_6 is visually different from all of the other symbols on the lip 537B, with each of the symbols 542B_1 to 542B_6 representing a particular circumferential location on the lip 537B. Thus, the symbols 542B_1 to 542B_6 can be used to track the amount of rotation of the turntable 406 relative to a starting point or a particular one of the symbols 542B_1 to 542B_n. The visually distinct symbols 542B_1 to 542B_n serve as markers, and the turntable 506B can be rotated clockwise and counterclockwise in the x-y plane by a certain or predetermined amount based on the symbols 542B_1 to 542B_n. For example, the centers of the symbols 542B_1 to 542B_n can be equally spaced circumferentially such that the amount of rotation of the turntable 506B in the x-y plane (in, for example, degrees) can be determined by determining how many of the symbols 542B_1 to 542B_n have passed through the notch 436 (FIG. 4A-4C).

In implementations in which the turntable 406 is capable of moving in the x-y plane by rotating in either the counterclockwise or clockwise directions, the direction (clockwise or counterclockwise) of the rotation of the turntable 506B can be inferred by identifying which of the symbols 542B_1 to 542B_n have passed through the notch 436.

Additionally, the angled facets 554 orient the symbol on the facet toward the imaging device 226, and the angle of the facets 554 can match the angle of the imaging device 226. As discussed with respect to FIGS. 4A-4C, the imaging device 226 can be positioned at an angle relative to the turntable 406. The facets 554 can be formed such that the symbol on the facet is oriented in a plane that is parallel to a plane that includes the imaging device 226. For example, the facets 554 can be configured such that the planar surface of the facet presents the symbol to the imaging device 226 with the symbol being flat, or not at angle relative to the imaging device 226.

Although the example of FIG. 5B is discussed with the facets 554 being at an angle (θ) relative to the −z direction, in some implementations, the facets 554 are not angled and instead extend in the −z direction from the perimeter 553B. For example, the lip 537A of the turntable 506A can be faceted.

Figure 6:
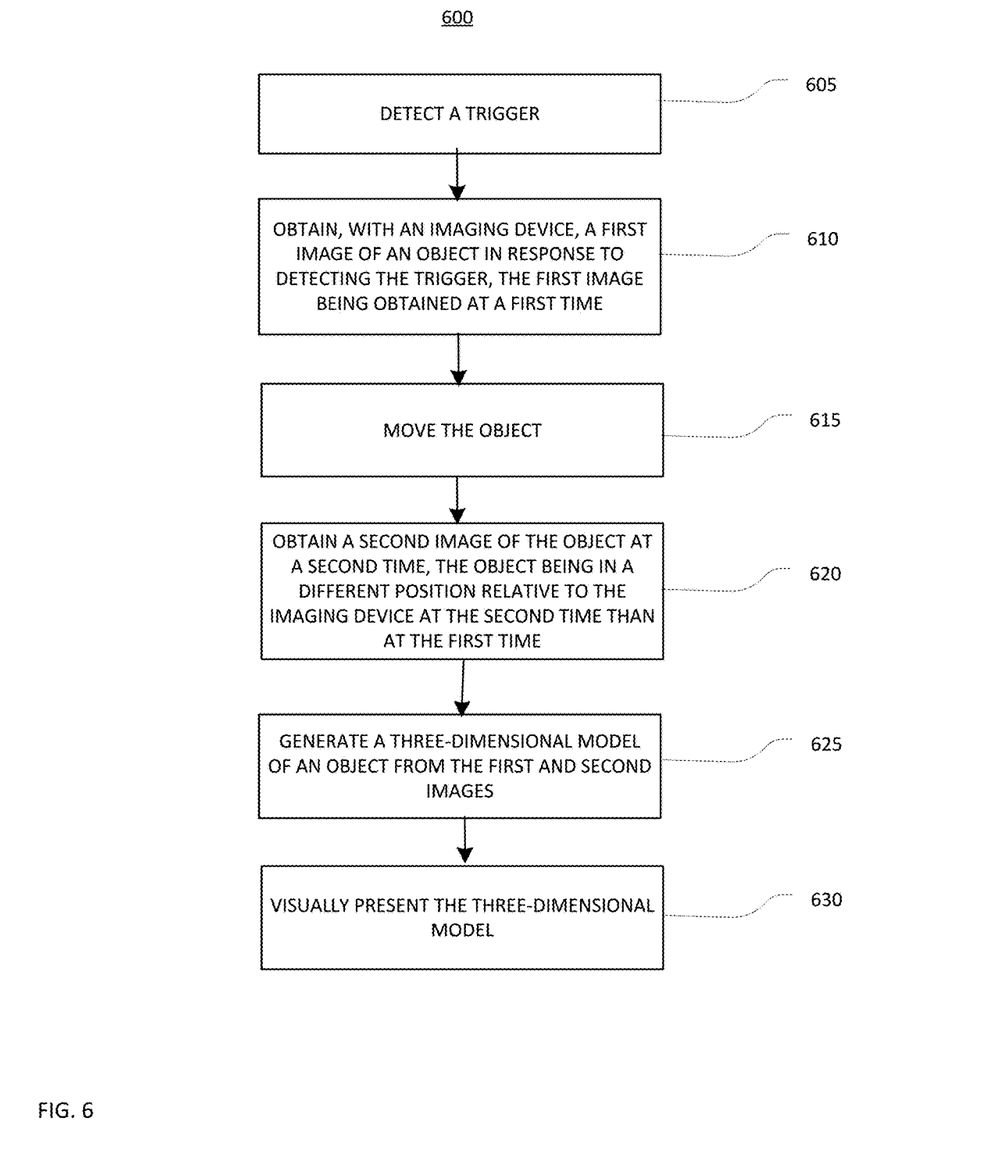
FIG. 6 is a flow chart of an exemplary process for generating a three-dimensional (3D) computer model of an object with a toy system.

Referring to FIG. 6, a flow chart of an exemplary process 600 for generating a 3D computer model of a user-supplied object is shown. The exemplary process 600 can be performed with the toy system 200 or the toy system 400, and the process 600 is discussed with respect to the toy system 400 and the portable electronic device 212 for brevity. The process 600 can be performed, partially or completely, by the one or more electronic processors 224 of the portable electronic device 212.

A trigger is detected (605). The trigger can be an internal trigger generated by the toy system 400 or one of its components (such as the crank 408 or the portable electronic device 212), or the trigger can come from an external source (such as the user of the toy system 400). Detecting the trigger can include detecting a representation of one of the symbols 542A (FIG. 5A) or one of the symbols 542B_1 to 542B_n (FIG. 5B) in an image taken by the imaging device 226. The symbol 542A or one of the symbols 542B_1 to 542B_n can be automatically identified in image data from the imaging device 226 by, for example, applying a pattern matching or edge detection algorithm to the image data.

Use of identical symbols, such as the symbols 542A, which are a plurality of identical symbols spaced along the perimeter 553A, can lead to a simpler and faster triggering process due to the identical nature of the symbols lending themselves to a simpler recognition and identification technique with only a single symbol to identify. In implementations in which a variety of different symbols are used, such as the symbols 542B_1 to 542B_n, representations of the various different symbols can be stored on the electronic storage 222 of the portable electronic device 212 in, for example, an array. To identify a detected symbol as a particular symbol, the representations in the array can be compared to the obtained data.

Other trigger mechanisms can be used. For example, in some implementations, detecting a trigger can include detecting a sound generated by the portable electronic device 212 and/or by the user (for example, clapping by the user). Thus, the trigger can take a variety of forms, can be separate from the mechanism that moves the turntable 406, and can be separate from the motion of the turntable, yet can still be used to trigger the capture of image data. Additionally, the image data can be collected as a constant stream of data.

In response to detecting the trigger, the imaging device 226 obtains a first image of the space 432 and an object (such as the object 302) in the space 432 (610). The first image can be stored in the electronic storage 222. The object in the space 432 is moved relative to the imaging device 226 by applying a manual, physical force to the crank 408 (615). Applying the force to the crank 408 causes the turntable 406 to move, which moves the object relative to the imaging device 226.

The imaging device 226 obtains a second image of the space 432 at a second time (620). The second time occurs after the first time. Because the turntable 406, which holds the object, rotates relative to the imaging device 226 in response to the user's operation of the hand crank 408, the second image of the space 432 shows the object at a different angle relative to the imaging device 226. Thus, the first and second of images are images that are taken at different times and each of the images shows a different portion of the object that rests on the turntable 406. Additional images can be obtained at subsequent times, and images can be obtained continuously once the trigger is detected.

A 3D computer model of the object is generated based on the first and second images (625). In implementations in which additional images are obtained subsequent to the first and second images, the 3D computer model can be generated based on the subsequent images as well as the first and second images. The 3D computer model can be generated by stitching together or otherwise combining the collected plurality of images. In some implementations, the 3D computer model is generated using 123D Catch, available from Autodesk of Mill Valley, Calif. In some implementations, the first image and/or the second image can be used to replace some or all of the vertex data of an existing 3D computer model of an object. The existing 3D model can be stored on the electronic storage 222, for example. The vertex data can be, for example, data that describes a location or position of a certain portion of the modelled object in three-dimensional space relative to other points on the object.

The 3D computer model is visually presented (630). For example, the 3D computer model can be visually presented by rendering the 3D computer model on a display included in the I/O interface of the portable electronic device 212. After the 3D computer model is visually presented, the user may manipulate and/or use the 3D computer model. For example, the user may add accessories (such as a hat and cane, as shown in FIG. 1) to the 3D model, use the 3D model as a player in an electronic video game, or provide the 3D model to a rapid prototyping system to create a physical model. In this way, the process 600 provides a virtual environment that includes a representation of the object.

The process 600 can obtain any number of images greater than one to generate the 3D computer model. For example, an image may be obtained each time the portable electronic device 212 detects one of the symbols 542A (FIG. 5A) or one of the symbols 542B_1 to 542B_n (FIG. 5B). In these examples, the relative position of the object in a particular one of these images can be determined based on which of the symbols 542A or 542B_1 to 542B_n corresponds to the particular image. In some implementations, twenty or more images of the object can be obtained, with each image showing the object in a different position relative to the imaging device 226.

In some implementations, the turntable includes only one of the symbols 542A (FIG. 5A), and a plurality of images are obtained in response to detecting the single symbol 542A. In this implementation, images are obtained until the single symbol is again detected in an image obtained by the imaging device 226. Because the hand crank 408 is operable to move the turntable in only one direction relative to the imaging device 226, when the symbol 542A is detected again in one of the plurality of images, the turntable 406 has rotated through 360° and a complete set of images of the object has been obtained.

Furthermore, and as discussed above with respect to FIG. 5B, in some implementations, the symbols are visually distinct from each other, such as the symbols 542B_1 to 542B_n. In these implementations, rotation amounts of the turntable 406 other than 360° can be determined by determining which of the symbols 542B_1 to 542B_n have been identified as being detected. In some implementations, the turntable can rotate in more than one direction (counterclockwise or clockwise), and the direction of rotation also can be determined from the order in which the symbols 542B_1 to 542B_n are identified as being detected. Additionally, when one or more of the symbols of the symbols 542B_1 to 542B_n is not detected, or no image data is associated with one or more of the symbols 542B_1 to 542B_n, image data associated with symbols that are immediately adjacent to the symbol that is lacking image data can be used to generate estimated image data for the symbol that is lacking image data.

Other implementations are within the scope of the claims. For example, the base 404 (FIGS. 4A-4C) can be formed without the foot 442, or with more than one foot like the foot 442.

In the example of FIG. 5B, the symbols 542B_1 to 542B_n are visually distinct from each other by being different shapes. However, the symbols 542B_1 to 542B_n can be visually distinct from each other by being, for example, different colors. The symbols 542B_1 to 542B_n can vary in both spatial geometry and color.

The space 115, 332, 432 can be, for example, a space that is large enough to hold an object that can be bound by a cube that is 5 inches (12.7 cm) on each side. The backdrops 109, 209, 309, 409 can extend from the base 104, 204, 304, 404, respectively, such that the object is completely within the space defined by the backdrop. For example, the greatest extent of the backdrop in the z direction can be greater than the greatest extent of the object in the z direction. The backdrops 109, 209, and 409 can have a matte finish, as discussed with respect to the backdrop 309, to eliminate or reduce shadows and provide a consistent background for an object.

What is claimed is:

1. A method comprising:

detecting a representation of a symbol in an image obtained by a portable electronic device, the representation of the symbol being associated with a particular region of a platform received at a toy system;

obtaining, with an imaging device of the portable electronic device, a first image of an object received in a space that extends from the platform in response to detecting the representation of the symbol, the first image being obtained at a first time;

moving the platform of the toy system in response to application of a manual force, wherein moving the platform moves the object relative to the imaging device;

obtaining a second image of the object at a second time, a position of the object relative to the imaging device being different at the second time than at the first time;

generating a virtual environment that includes a representation of the object based on the first and second images; and visually presenting the virtual environment at the portable electronic device.

2. The method of claim 1, wherein the representation of the object is a three-dimensional (3D) model.

3. The method of claim 2, wherein the second image is obtained in response to detecting a second representation of a symbol.

4. The method of claim 3, wherein detecting a second representation of a symbol comprises detecting a representation of a second symbol in an image obtained by the portable electronic device, the second symbol being visually distinct from the symbol.

5. The method of claim 4, further comprising:
identifying the detected representation of a symbol as a representation of a first particular symbol on the platform; and
identifying the detected second representation of a symbol as a representation of a second particular symbol on the platform.

6. The method of claim 5, further comprising determining an amount of movement of the platform based on the identity of the first particular symbol and the identity of the second particular symbol.

7. The method of claim 5, further comprising determining whether a third representation of a symbol has been detected.

8. The method of claim 7, wherein a third representation of a symbol is determined to be detected, and the detected third representation of the symbol corresponds to a third symbol on the platform, the third symbol being on the platform between the first particular symbol and the second particular symbol.

9. The method of claim 8, further comprising:
determining whether image data of the object is present in an image detected in response to detecting the third representation of a symbol; and
if image data of the object is not determined to be present, generating an estimated image of the object based on the image of the first image and the second image.

10. The method of claim 7, further comprising, if a third representation of a symbol has not been determined to be detected, generating an estimated image of the object based on the first image and the second image.

11. The method of claim 5, wherein the first particular symbol and the second particular symbol are adjacent to each other on the platform.

12. The method of claim 3, wherein detecting a second representation of a symbol comprises detecting a symbol that is visually identical to the detected symbol.

13. The method of claim 2, wherein visually presenting the virtual environment comprises visually presenting the virtual environment on a display of the portable electronic device.

14. The method of claim 13, further comprising modifying the representation of the object in the virtual environment that is visually presented in response to user manipulation of the portable electronic device.

15. The method of claim 14, wherein modifying the representation of the object in the virtual environment comprises one or more of moving the representation of the object in the visually presented virtual environment to a different portion of the display, overlaying accessories on the representation of the object, or placing the representation of the object in a computerized game.

16. The method of claim 1, further comprising identifying one or more of the object and a characteristic of the object based on one or more of the first image and the second image.

17. The method of claim 16, wherein a characteristic of the object is identified, the characteristic comprising a color, and further comprising: assigning one or more attributes to the representation of the object in the virtual environment based on the identified color.

18. The method of claim 16, wherein the characteristic of the object comprises one or more of items and functionality associated with a character.

19. The method of claim 1, wherein the representation of the symbol is a representation of the only symbol on the platform of the toy system, and further comprising: after obtaining the second image at the second time, obtaining additional images until the representation of the symbol is detected in an obtained image.

* * * * *